United States Patent
Chen

(10) Patent No.: US 9,520,077 B2
(45) Date of Patent: Dec. 13, 2016

(54) FOUR COLOR CONVERTER, DISPLAY APPARATUS AND METHOD FOR CONVERTING THREE COLOR DATA TO FOUR COLOR DATA

(71) Applicant: SHENZHEN CHINA STAR OPTOELECTRONICS TECHNOLOGY CO., LTD., Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 303 days.

(21) Appl. No.: 14/368,785

(22) PCT Filed: Jun. 4, 2014

(86) PCT No.: PCT/CN2014/079187
§ 371 (c)(1),
(2) Date: Jun. 25, 2014

(87) PCT Pub. No.: WO2015/180199
PCT Pub. Date: Dec. 3, 2015

(65) Prior Publication Data
US 2015/0356901 A1 Dec. 10, 2015

(30) Foreign Application Priority Data
May 29, 2014 (CN) .......................... 2014 1 0234553

(51) Int. Cl.
*G09G 5/02* (2006.01)
*G09G 3/20* (2006.01)
(Continued)

(52) U.S. Cl.
CPC .............. *G09G 3/2003* (2013.01); *G09G 5/02* (2013.01); *H04N 9/67* (2013.01);
(Continued)

(58) Field of Classification Search
CPC combination set(s) only.
See application file for complete search history.

(56) References Cited

U.S. PATENT DOCUMENTS 6,876,384 B1 * 4/2005 Hubina .................. H04N 9/735
348/222.1
9,280,940 B2 * 3/2016 Chen .................... G09G 3/3607
(Continued)

FOREIGN PATENT DOCUMENTS

CN 1551707 A 12/2004

*Primary Examiner* — Wesner Sajous
(74) *Attorney, Agent, or Firm* — Andrew C. Cheng

(57) ABSTRACT

A four color converter includes: a first white balance module configured to effect white balance processing on raw RGB data to thereby obtain white balance processed RGB data, a four color determining module configured to determine RGBW data according to white balance processed RGB data provided by the first white balance module and a white color data extracted from the white balance processed RGB data; and a second white balance module configured to effect white balance processing on the RGBW data provided by the four color determining module to thereby obtain white balance processed RGBW data for display. The present invention further discloses a display apparatus having the four color converter and a method for converting three color data to four color data. The present invention can achieve remaining chromaticity value of each color unchanged as long as a ratio of four color data is not changed.

8 Claims, 2 Drawing Sheets

(51) Int. Cl.
*H04N 1/60* (2006.01)
*H04N 5/57* (2006.01)
*H04N 9/73* (2006.01)
*H04N 5/202* (2006.01)
*H04N 9/67* (2006.01)

(52) U.S. Cl.
CPC . *G09G 2300/0452* (2013.01); *G09G 2300/08* (2013.01); *G09G 2340/06* (2013.01)

(56) References Cited

U.S. PATENT DOCUMENTS

| | | | | |
|---|---|---|---|---|
| 2005/0285828 | A1* | 12/2005 | Inoue | G09G 3/3208 345/76 |
| 2006/0214942 | A1* | 9/2006 | Tanase | G09G 3/2003 345/589 |
| 2006/0268003 | A1* | 11/2006 | Tanase | G09G 3/2003 345/603 |
| 2013/0272605 | A1* | 10/2013 | Saito | G06T 5/002 382/167 |
| 2013/0286271 | A1* | 10/2013 | Ishii | G09G 3/3607 348/333.01 |
| 2015/0029358 | A1* | 1/2015 | Kaizu | H04N 9/07 348/223.1 |

* cited by examiner

FOUR COLOR CONVERTER, DISPLAY APPARATUS AND METHOD FOR CONVERTING THREE COLOR DATA TO FOUR COLOR DATA

TECHNICAL FIELD

The present invention relates to the field of display technology, and particularly to a four color converter, a display apparatus and a method for converting three color data to four color data.

DESCRIPTION OF RELATED ART

Nowadays, in the display apparatuses having such as liquid crystal display (LCD) panels or organic light emitting diode (OLED) display panels, most of which use a red (R) sub-pixel unit, a green (G) sub-pixel unit and a blue (B) sub-pixel unit together to constitute one pixel unit. By controlling a grayscale data of each sub-pixel unit to mix a color wanted to be displayed by display panel and thereby displaying a color image. With the development of information technology, various requirements of display panel are increasing, high transmittance, low power consumption and good image quality are becoming the demands of people to the display panel. The transmittance and mixing efficiency of the conventional RGB three primary color mixing display manner are relatively low, resulting in the power consumption of display panel is high, which restricts the product optimization of display panel. Accordingly, a display panel having a four-pixel display unit constituted by a red (R) sub-pixel unit, a green (G) sub-pixel unit, a blue (B) sub-pixel unit and a fourth sub-pixel unit together has been proposed, so as to improve the display quality of RGB display panel.

U.S. Pat. No. 7,277,075 B1 has published a liquid crystal display apparatus capable of color display. The liquid crystal display apparatus includes a liquid crystal display panel in which each main pixel unit includes a red sub-pixel, a green sub-pixel, a blue sub-pixel and a luminance sub-pixel. Furthermore, the liquid crystal display apparatus includes a calculation module for calculating a digital value W for driving the luminance sub-pixel and digital values Ro, Go and Bo respectively for driving the red sub-pixel, the green sub-pixel and the blue sub-pixel, from digital input values Ri, Gi and Bi obtained from an input image signal respectively for the red sub-pixel, the green sub-pixel and the blue sub-pixel, so that a relationship of Ri:Gi:Bi=(Ro+W):(Go+W):(Bo+W) is satisfied. By using the values of Ro, Go, Bo and W, compared with the luminance of pixel structure only having the red sub-pixel, the green sub-pixel and the blue sub-pixel, the luminance of the pixel structure with the additional luminance sub-pixel is enhanced.

However, the liquid crystal display apparatus would not meet the demands of satisfying the condition of the ratio of Ri:Gi:Bi being unchanged meanwhile remaining displayed color unchanged.

SUMMARY

In order to solve the problem in the prior art, an objective of the present invention is to provide a four color converter, a display apparatus and a method for converting three color data to four color data which satisfy displayed color remaining unchanged as long as the ratio of four color data is not changed.

According to an aspect of the present invention, a four color converter includes: a first white balance module configured (i.e., structured and arranged) to effect white balance processing on raw RGB data to thereby obtain white balance processed RGB data; a four color determining module configured to determine RGBW data according to white balance processed RGB data provided by the first white balance module and a white color data extracted from the white balance processed RGB data; and a second white balance module configured to effect white balance processing on the RGBW data provided by the four color determining module to thereby obtain white balance processed RGBW data for display.

In an exemplary embodiment, the first white balance module is configured to effect white balance processing on each color data of the raw RGB data to thereby obtain each color data of the white balance processed RGB data.

In an exemplary embodiment, the four color determining module includes: a luminance conversion module configured to convert each color data of the white balance processed RGB data provided by the first white balance module to luminance data of each color; a comparison module configured to compare the luminance data of each color of the white balance processed RGB data provided by the luminance conversion module with one another to thereby obtain a minimum luminance data; a white color determining module configured to convert the minimum luminance data provided by the comparison module to the white color data of the RGBW data; and a three color calculation module configured to calculate each color data of the RGBW data corresponding to each color of the white balance processed RGB data according to each color data of the white balance processed RGB data provided by the first white balance module and the white color data of the RGBW data provided by the white color determining module.

In an exemplary embodiment, the three color calculation module includes: a red color calculation module configured to subtract the white color data of the RGBW data provided by the white color determining module from a red color data of the white balance processed RGB data provided by the first white balance module to thereby obtain a red color data of the RGBW data; a green color calculation module configured to subtract the white color data of the RGBW data provided by the white color determining module from a green color data of the white balance processed RGB data provided by the first white balance module to thereby obtain a green color data of the RGBW data; and a blue color calculation module configured to subtract the white color data of the RGBW data provided by the white color determining module from a blue color data of the white balance processed RGB data provided by the first white balance module to thereby obtain a blue color data of the RGBW data.

According to another aspect of the present invention, a display apparatus at least includes: the above four color converter configured to convert raw RGB data to white balance processed RGBW data; a data driver configured to process the white balance processed RGBW data provided from the four color converter to thereby generate analog four color signals; a scan driver configured to sequentially generate scan signals; and a display panel configured to display a color in response to the analog four color signals provided from the data driver and the scan signals provided from the scan driver.

According to still another aspect of the present invention, a method for converting three color data to four color data at least includes steps of: A) effecting white balance processing on raw RGB data to thereby obtain white balance processed RGB data; B) determining RGBW data according to the white balance processed RGB data and a white color data extracted from the white balance processed RGB data; and C) effecting white balance processing on the RGBW data to thereby obtain white balance processed RGBW data for display.

In an exemplary embodiment, the step A) includes: effecting white balance processing on each color data of the raw RGB data to thereby obtain each color data of the white balance processed RGB data.

In an exemplary embodiment, the step B) includes: converting each color data of the white balance processed RGB data to luminance data of each color; comparing the luminance data of each color of the white balance processed RGB data with one another to thereby obtain a minimum luminance data; converting the minimum luminance data to the white color data of the RGBW data; and calculating each color data of the RGBW data corresponding to each color of the white balance processed RGB data according to each color data of the white balance processed RGB data and the white color data of the RGBW data.

In an exemplary embodiment, the step of calculating each color data of the RGBW data corresponding to each color of the white balance processed RGB data includes: subtracting the white color data of the RGBW data from a red color data of the white balance processed RGB data to thereby obtain a red color data of the RGBW data; subtracting the white color data of the RGBW data from a green color data of the white balance processed RGB data to thereby obtain a green color data of the RGBW data; and subtracting the white color data of the RGBW data from a blue color data of the white balance processed RGB data to thereby obtain a blue color data of the RGBW data.

Accordingly, the four color converter, the display apparatus and a method for converting three color data to four color data in accordance with various embodiment of the present invention can achieve remaining displayed color unchanged as long as a ratio of four color data being not changed.

BRIEF DESCRIPTION OF THE DRAWINGS

The above embodiments will become more readily apparent to those ordinarily skilled in the art after reviewing the following detailed description and accompanying drawings.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

In the following exemplary embodiments, the display apparatus for example is a liquid crystal display (LCD) apparatus, an organic light emitting diode (OLED) display apparatus, and so on.

Figure 1:
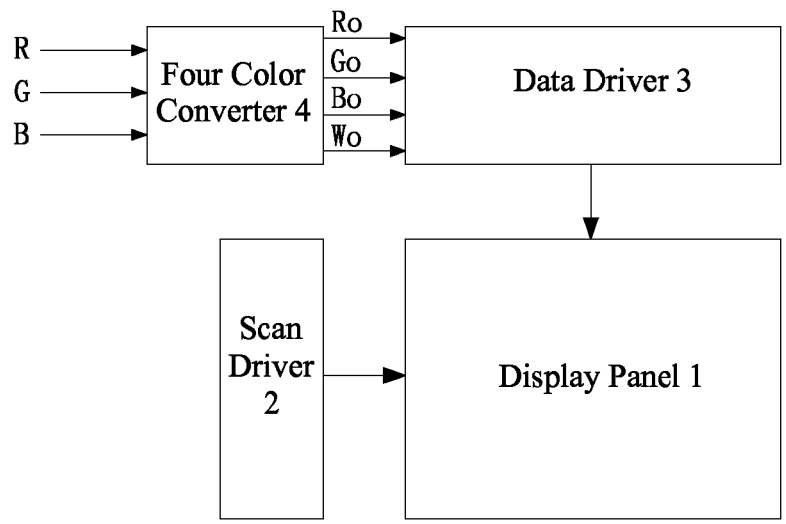
FIG. 1 is a schematic block diagram of a display apparatus in accordance with an exemplary embodiment of the present invention.
Figure 2:
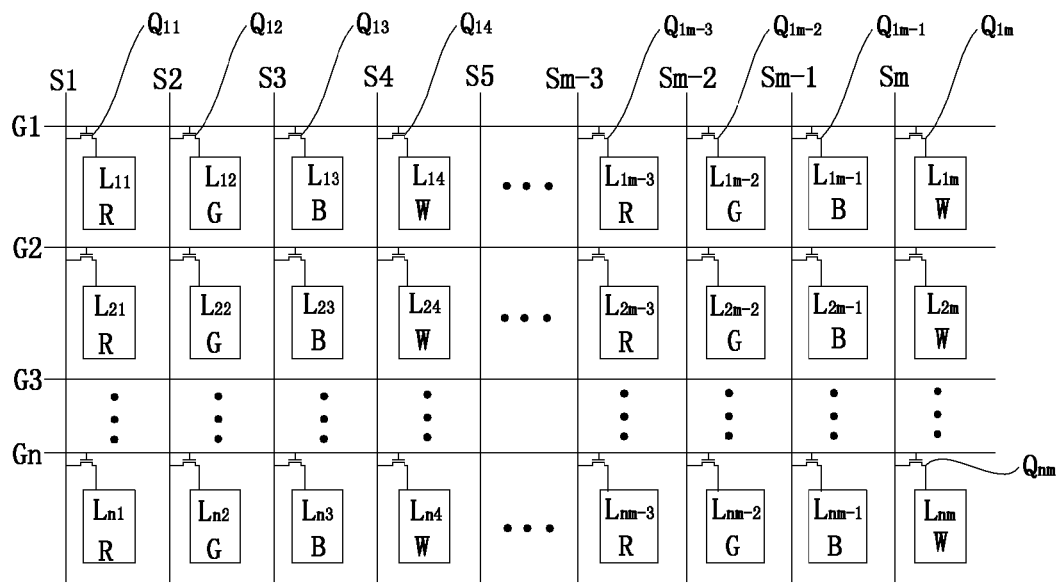
FIG. 2 is a schematic structural diagram of a display panel in accordance with an exemplary embodiment of the present invention.

FIG. 1 is a schematic block diagram of a display apparatus in accordance with an exemplary embodiment of the present invention. FIG. 2 is a schematic structural diagram in accordance with an exemplary embodiment of the present invention.

Referring to FIG. 1 and FIG. 2 together, the display apparatus in accordance with the exemplary embodiment of the present invention includes a display panel 1, a scan driver 2, a data driver 3 and a four color converter 4.

The display panel 1 includes scan lines G1 to Gm (in is a natural number) extending along row direction, and data lines Si to Sn (n is a natural number) extending along column direction. The scan lines G1 to Gm are connected to the scan driver 2. The data lines Si to Sn are connected to the data driver 3.

Each sub-pixel Lij, i.e., a red (R) sub-pixel, a green (G) sub-pixel, a blue (B) sub-pixel or a white (W) sub-pixel, is arranged in a region defined by scan lines Gi, Gi+1 (i is from 1 to m) and data lines Sj, Sj+1 (j is from 1 to n). In the illustrated embodiment, one red sub-pixel, one green sub-pixel, one blue sub-pixel and one white sub-pixel together constitute one pixel.

Each thin film transistor (TFT) Qij is arranged near an intersection of the scan line Gi and the data line Sj.

Moreover, the scan line Gi is connected to a gate electrode of the thin film transistor Qij, the data line Sj is connected to a source electrode the thin film transistor Qij, and a pixel electrode of the sub-pixel Lij (i.e., a red sub-pixel, a green sub-pixel, a blue sub-pixel or a white sub-pixel) is connected to the drain electrode of the thin film transistor Qij.

A common electrode arranged opposite to the pixel electrode of the sub-pixel Lij is connected to a common voltage circuit (not shown).

The scan driver 2 and the data driver 3 are arranged in a peripheral region of the display panel 1. The four color converter 4 converts raw RGB data to white balance processed RGBW data and provides the RGBW data to the data driver 3. The raw RGB data is provided for example from an external host computer or graphic controller (not shown).

The data driver 3 receives and processes RGBW chromaticity compensation data after chromaticity compensation provided from the four color converter 4 to generate analog data signals and then provide the analog data signals onto the data lines S1 to Sn. The scan driver 2 sequentially provides multiple scan signals onto the scan lines G1 to Gin.

Figure 3:
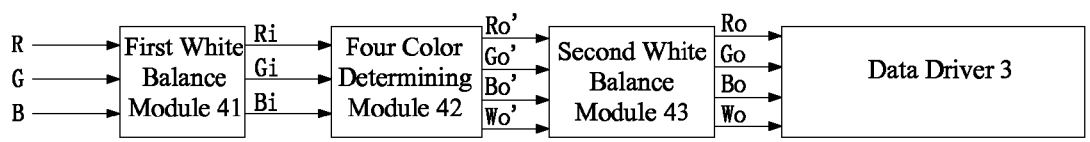
FIG. 3 is a principal block diagram of a four color converter in accordance with an exemplary embodiment of the present invention.

FIG. 3 is a principal block diagram of the four color converter in accordance with an exemplary embodiment of the present invention.

Referring to FIG. 3, the four color converter 4 in accordance with the exemplary embodiment of the present invention includes a first white balance module 41, a four color determining module 42 and a second white balance module 43. The four color converter 4 receives raw RGB data and converts the received raw RGB data to white balance processed RGBW data. For example, in an embodiment, the four color converter 4 includes one or more processors and a memory storing software modules executed by the one or more processors including the first white balance module 41, the four color determining module 42 and the second white balance module 43.

Specifically, the first white balance module 41 receives raw RGB data and effects white balance processing on the received raw RGB data, so as to achieve that a mixed color of the multiple colors remains unchanged as long as a ratio of grayscale values of multiple colors (i.e., R color, G color, B color) Ri:Gi:Bi being not changed. Where Ri, Gi and Bi respectively are the grayscale values of R color, G color and B color. Each color data of the raw RGB data is converted to each color data of white balance processed RGB data. The first white balance module 41 provides the white balance processed RGB data to the four color determining module 42.

The four color determining module 42 receives the white balance processed RGB data, extracts a white color (W) data from the white balance processed RGB data and determines a new RGBW data according to the received white balance processed RGB data and the extracted white color data. The four color determining module 42 provides the determined new RGBW data to the second white balance module 43.

Since even if a ratio of grayscale values of multiple colors of the new RGBW data is not changed, the displayed color of the display apparatus would changes, and therefore it is necessary to further effect white balance processing on the new RGBW data.

The second white balance module 43 receives the new RGBW data and effects white balance processing on the received new RGBW data to thereby achieve that the displayed color no longer changes as long as the ratio of grayscale values of the multiple colors (i.e., R color, G color, B color and W color in the illustrated embodiment) Ro:Go:Bo:Wo remains changed. Where Ro, Go, Bo and Wo respectively are grayscale values of R color, G color, G color and W color of the white balance processed RGBW data. Each color data of the new RGBW data is converted to each color data of the white balance processed RGBW data. The second white balance module 43 provides the white balance processed RGBW data to the data driver 3.

Hereinafter, the four color determining module 42 in accordance with an exemplary embodiment will be described in detail, and the four color determining module is not limited to the illustration of the following exemplary embodiment.

Figure 4:
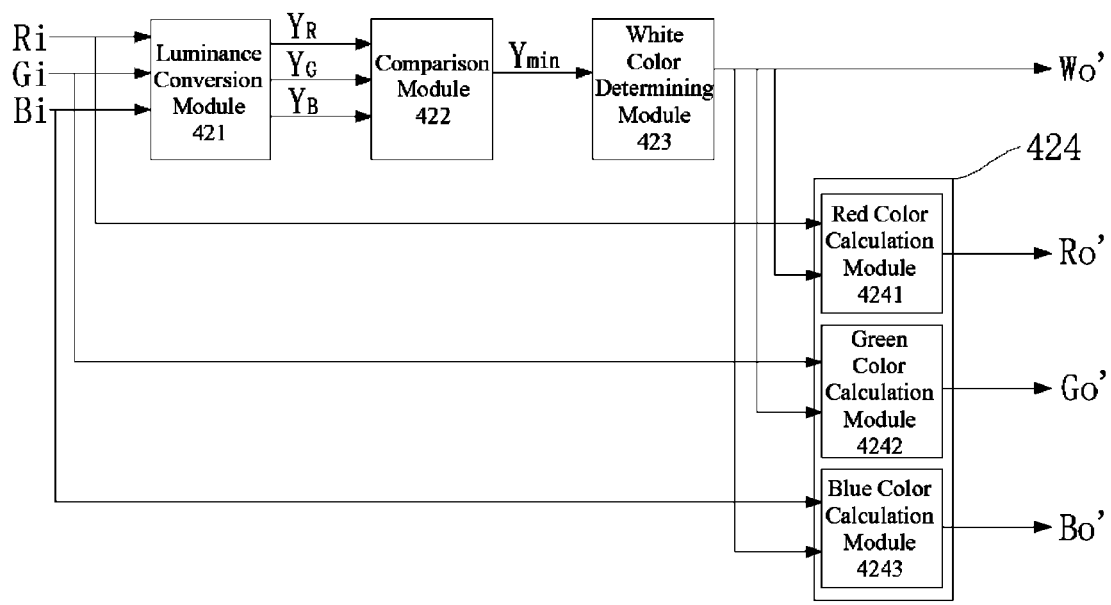
FIG. 4 is a principal block diagram of a four color determining module in accordance with an exemplary embodiment of the present invention.

FIG. 4 is a principal block diagram of the four color determining module according to the exemplary embodiment of the present invention.

Referring to FIG. 4, the four color determining module 42 in accordance with the exemplary embodiment of the present invention includes: a luminance conversion module 421, a comparison module 422, a white color determining module 423 and a three color calculation module 424. For example, the luminance conversion module 421, the comparison module 422, the white color determining module 423 and the three color calculation module 424 all are software modules.

The luminance conversion module 421 receives the white balance processed RGB data and converts grayscale values of colors (i.e., R color, G color and B color) of the white balance processed RGB data to luminance data corresponding to the colors, so that the following relationships are satisfied. That is, $Y_R=kRi^{2.2}$, $Y_G=kGi^{2.2}$, and $Y_B=kBi^{2.2}$. Where Ri, Gi, Bi are grayscale values respectively corresponding to R color, G color and B color, $Y_R$, $Y_G$ and $Y_B$ are luminance values after conversion respectively corresponding to R color, G color and B color. In addition, k is constant. The luminance conversion module 421 provides the luminance values of the colors to the comparison module 422.

The comparison module 422 receives the luminance values of the colors from the luminance conversion module 421 and compares the received luminance values with one another to obtain a minimum luminance value Ymin therea-mong. The comparison module 422 provides the obtained minimum luminance value Ymin to the white color determining module 423.

The white color determining module 423 receives the minimum luminance value Ymin and converts the minimum luminance value Ymin to a grayscale value Wo' of white color of the new RGBW data. The white color determining module 423 provides the grayscale value Wo' of white color of the new RGBW data after conversion to the three color calculation module 424 and the second white balance module 43.

The three color calculation module 424 receives the grayscale value Wo' of W color of the new RGBW data after conversion provided by the white color determining module 423 and the grayscale value of each color of the white balance processed RGB data provided by the first white balance module 41, and calculates grayscale value of each color of the new RGBW data corresponding to each color of the white balance processed RGB data according to the grayscale value Wo' of W color provided by the white color determining module 423 and the grayscale value of each color of the white balance processed RGB data provided by the first white balance module 41.

Furthermore, the three color calculation module 424 includes a red color calculation module 4241, a green color calculation module 4242 and a blue color calculation module 4243.

The red color calculation module 4241 receives the grayscale value Ri of R color of the white balance processed RGB data and the grayscale value Wo' of W color of the new RGBW data, and calculates the grayscale value Ro' of R color of the new RGBW data according to the received grayscale value Ri of R color of the white balance processed RGB data and grayscale value Wo' of W color of the new RGBW data so that Ro'=Ri-Wo'. The red color calculation module 4241 provides the grayscale value Ro' of R color of the new RGBW data to the second white balance module 43.

The green color calculation module 4242 receives the grayscale value Gi of G color of the white balance processed RGB data and the grayscale value Wo' of W color of the new RGBW data, and calculates the grayscale value Go' of G color of the new RGBW data according to the received grayscale value Gi of G color of the white balance processed RGB data and grayscale value Wo' of W color of the new RGBW data so that Go'=Gi-Wo'. The green color calculation module 4242 provides the grayscale value Go' of G color of the new RGBW data to the second white balance module 43.

The blue color calculation module 4243 receives the grayscale value Bi of B color of the white balance processed RGB data and the grayscale value Wo' of white W color of the new RGBW data, and calculates the grayscale value Bo' of B color of the new RGBW data according to the received grayscale value Bi of B color of the white balance processed RGB data and grayscale value Wo' of W color of the new RGBW data so that Bo'=Bi-Wo'. The blue color calculation module 4243 provides the grayscale value Bo' of B color of the new RGBW data to the second white balance module 43.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A four color converter comprising:
   a first white balance circuit that effects white balance processing on raw RGB data to thereby obtain white balance processed RGB data;
   a four color determining circuit that determines RGBW data according to the white balance processed RGB data provided by the first white balance circuit and a white color data extracted from the white balance processed RGB data; and
   a second white balance circuit that effects white balance processing on the RGBW data provided by the four color determining circuit to thereby obtain white balance processed RGBW data for display;
   wherein the four color determining circuit comprises:
   a luminance conversion circuit that converts each color data of the white balance processed RGB data provided by the first white balance circuit to luminance data corresponding to each color;
   a comparison circuit that compares luminance data of each color of the white balance processed RGB data provided by the luminance conversion circuit with one another to thereby obtain a minimum luminance data;
   a white color determining circuit that converts the minimum luminance data provided by the comparison circuit to a white color data of the RGBW data; and
   a three color calculation circuit that calculates each color data of the RGBW data corresponding to each color of the white balance processed RGB data according to each color data of the white balance processed RGB data provided by the first white balance circuit and the white color data of the RGBW data provided by the white color determining circuit.

2. The four color converter according to claim 1, wherein the first white balance circuit effects white balance processing on each color data of the raw RGB data to thereby obtain each color data of white balance processed RGB data.

3. The four color converter according to claim 1, wherein the three color calculation circuit comprises:
   a red color calculation circuit that subtracts the white color data of the RGBW data provided by the white color determining circuit from a red color data of the white balance processed RGB data provided by the first white balance circuit to thereby calculate out a red color data of the RGBW data;
   a green color calculation circuit that subtracts the white color data of the RGBW data provided by the white color determining circuit from a green color data of the white balance processed RGB data provided by the first white balance circuit to thereby calculate out a green color data of the RGBW data; and
   a blue color calculation to circuit that subtracts the white color data of the RGBW data provided by the white color determining circuit from a blue color data of the white balance processed RGB data provided by the first white balance circuit to thereby calculate out a blue color data of the RGBW data.

4. The four color converter according to claim 2, wherein the three color calculation circuit comprises:
   a red color calculation circuit that subtracts the white color data of the RGBW data provided by the white color determining circuit from a red color data of the white balance processed RGB data provided by the first white balance circuit to thereby calculate out a red color data of the RGBW data;
   a green color calculation circuit that subtracts the white color data of the RGBW data provided by the white color determining circuit from a green color data of the white balance processed RGB data provided by the first white balance circuit to thereby calculate out a green color data of the RGBW data; and
   a blue color calculation circuit that subtracts the white color data of the RGBW data provided by the white color determining circuit from a blue color data of the white balance processed RGB data provided by the first white balance circuit to thereby calculate out a blue color data of the RGBW data.

5. A display apparatus, comprising:
   a four color converter that converts raw RGB data to white balance processed RGBW data;
   a data driver that processes the white balance processed RGBW data provided from the four color converter and thereby generate analog four color signals;
   a scan driver that sequentially generates scan signals; and
   a display panel that displays a color in response to the analog four color signals provided from the data driver and the scan signals provided from the scan driver;
   wherein, the four color converter comprising:
   a first white balance circuit that effects white balance processing on raw RGB data to thereby obtain white balance processed RGB data;
   a four color determining circuit that determines RGBW data according to the white balance processed RGB data provided by the first white balance circuit and a white color data extracted from the white balance processed RGB data; and
   a second white balance circuit that effects white balance processing on the RGBW data provided by the four color determining circuit to thereby obtain white balance processed RGBW data for display; and
   wherein the four color determining circuit comprises:
   a luminance conversion circuit that converts each color data of the white balance processed RGB data provided by the first white balance circuit to luminance data corresponding to each color;
   a comparison circuit that compares luminance data of each color of the white balance processed RGB data provided by the luminance conversion circuit with one another to thereby obtain a minimum luminance data;
   a white color determining circuit that converts the minimum luminance data provided by the comparison circuit to a white color data of the RGBW data; and
   a three color calculation circuit that calculates each color data of the RGBW data corresponding to each color of the white balance processed RGB data according to each color data of the white balance processed RGB data provided by the first white balance circuit and the white color data of the RGBW data provided by the white color determining circuit.

6. The display apparatus according to claim 5, wherein the first white balance circuit effects white balance processing on each color data of the raw RGB data to thereby obtain each color data of white balance processed RGB data.

7. The display apparatus according to claim 5, wherein the three color calculation circuit comprises:
   a red color calculation circuit that subtracts the white color data of the RGBW data provided by the white color determining circuit from a red color data of the white balance processed RGB data provided by the first white balance circuit to thereby calculate out a red color data of the RGBW data;
   a green color calculation circuit that subtracts the white color data of the RGBW data provided by the white color determining circuit from a green color data of the white balance processed RGB data provided by the first white balance circuit to thereby calculate out a green color data of the RGBW data; and a blue color calculation circuit that subtracts the white color data of the RGBW data provided by the white color determining circuit from a blue color data of the white balance processed RGB data provided by the first white balance circuit to thereby calculate out a blue color data of the RGBW data.

8. The display apparatus according to claim 6, wherein the three color calculation circuit comprises:

a red color calculation circuit that subtracts the white color data of the RGBW data provided by the white color determining circuit from a red color data of the white balance processed RGB data provided by the first white balance circuit to thereby calculate out a red color data of the RGBW data;

a green color calculation circuit that subtracts the white color data of the RGBW data provided by the white color determining circuit from a green color data of the white balance processed RGB data provided by the first white balance circuit to thereby calculate out a green color data of the RGBW data; and a blue color calculation circuit that subtracts the white color data of the RGBW data provided by the white color determining circuit from a blue color data of the white balance processed RGB data provided by the first white balance circuit to thereby calculate out a blue color data of the RGBW data.

* * * * *